C. SCHMIDT.
GEARING FOR MOTOR VEHICLES.
APPLICATION FILED FEB. 6, 1905.
950,191.
Patented Feb. 22, 1910.
3 SHEETS—SHEET 1.
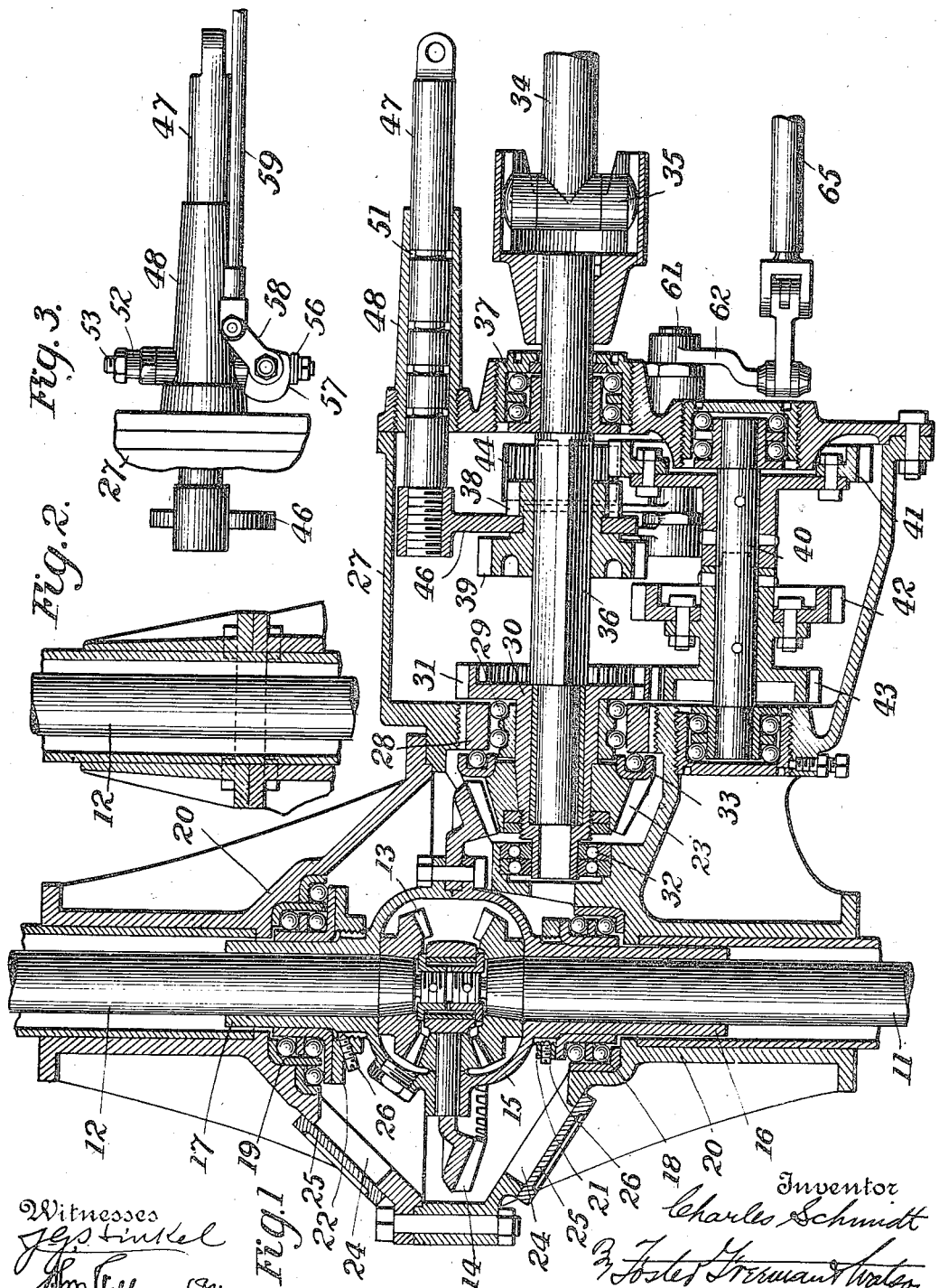

C. SCHMIDT.
GEARING FOR MOTOR VEHICLES.
APPLICATION FILED FEB. 6, 1905.

950,191.

Patented Feb. 22, 1910.
3 SHEETS—SHEET 2.

Witnesses

Inventor
Charles Schmidt
By Foster Freeman & Watson
Attorneys

C. SCHMIDT.
GEARING FOR MOTOR VEHICLES.
APPLICATION FILED FEB. 6, 1905.
950,191.
Patented Feb. 22, 1910.
3 SHEETS—SHEET 3.
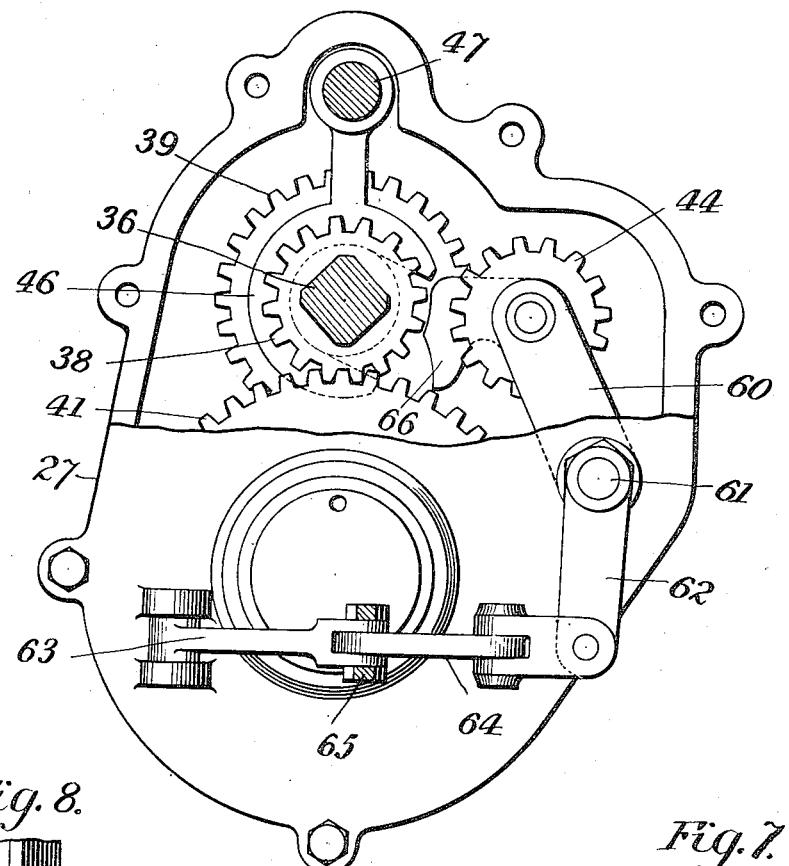
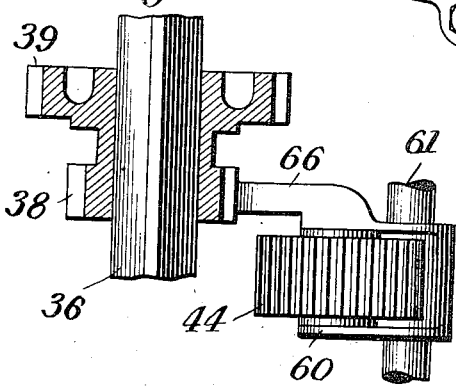
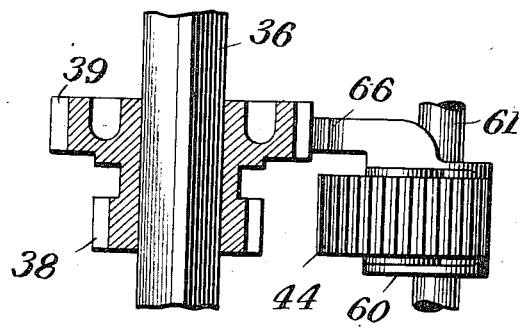
Witnesses
Inventor
Charles Schmidt
By Foster Freeman & Watson
Attorneys

UNITED STATES PATENT OFFICE.

CHARLES SCHMIDT, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

GEARING FOR MOTOR-VEHICLES.

950,191.  Specification of Letters Patent.  Patented Feb. 22, 1910.

Application filed February 6, 1905. Serial No. 244,437.

*To all whom it may concern:*

Be it known that I, CHARLES SCHMIDT, a citizen of the Republic of France, and resident of Detroit, Wayne county, State of Michigan, have invented a new and useful Improvement in Gearing for Motor-Vehicles, of which the following is a specification.

The present invention relates to improvements in transmission gearing for motor vehicles, and particularly to the improvements in the mechanism illustrated in application Serial No. 205,325, filed by me on April 28, 1904.

Figure 4:
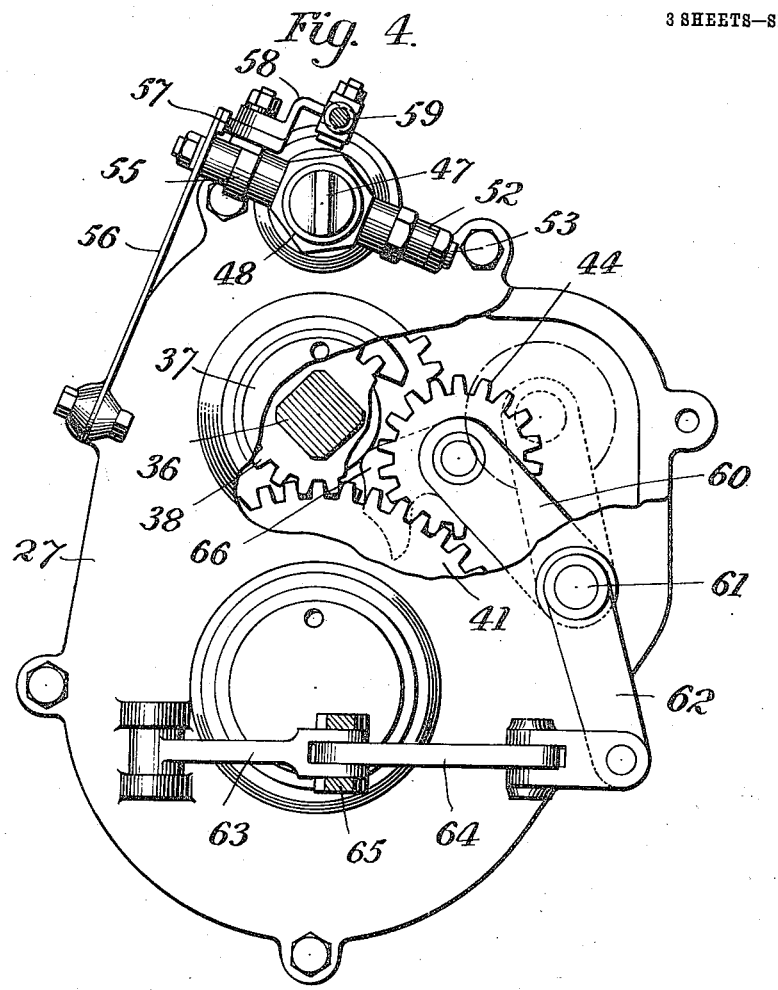
Figure 5:
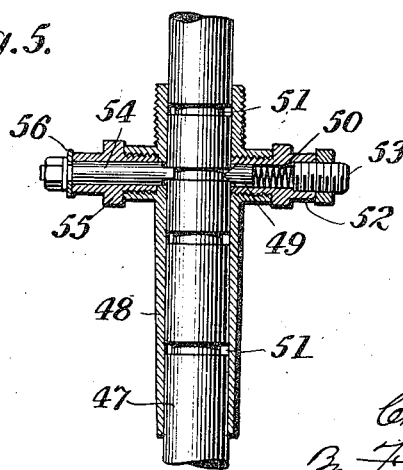

The invention will be described in detail in connection with the accompanying drawings, in which, Figure 1 is a horizontal section through the rear axle and the gearing of a motor vehicle; Fig. 2 is a continuation of Fig. 1 showing an additional portion of the axle; Fig. 3 is a detail of the speed gear shifting means; Fig. 4 is an end view of the gear case illustrated in Fig. 1; Fig. 5 is a sectional view of the locking device for the gear shifting means; Fig. 6 is a view showing the interlocking device for preventing operation of the reverse gear while the forward speed gears are in mesh; Fig. 7 shows the interlocking shoe in engagement with the larger shifting gear; and Fig. 8 shows the interlocking shoe in engagement with the smaller shifting gear.

Referring to the drawing, 11 and 12 indicate the two sections of the driving axle. These sections are suitably connected by differential gearing 13 which is driven by a beveled gear 14 supported on the casing 15 which incloses the differential gears. The casing 15 has two diametrically opposite trunnions 16, 17 which form bearings for the driving axle sections. The casing 15 and the trunnions 16 and 17 generally turn with the driving axle and hence there is not much wear or friction between these parts. The trunnions 16, 17, are supported in ball bearings 18, 19, in the fixed frame or gear case 20. Threaded on the trunnions 16, 17, are adjusting rings 21, 22, by means of which the ball bearings 18, 19, are properly adjusted. The rings 21, 22, also serve to adjust the beveled gear 14 with respect to its driving pinion 23. Openings 24 are provided in the casing 20 through which access may be had to the adjusting rings 21, 22 without disturbing the casing or the gearing. These openings are normally closed by covers 25, bolted or otherwise secured to the casing. The adjusting rings are locked in any desired position by screws 26 which are threaded into the rings and enter grooves or slots in the trunnions 16, 17. Each of the trunnions is provided with several slots to receive the set screws 26. By means of the rings 21, 22, the axle sections and the differential gearing are bodily adjustable and the mesh of the gears 14 and 23 may therefore be adjusted quickly and with the greatest accuracy. Furthermore, as will be evident, this adjustment may be made without disturbing any of the casings or gearing by simply removing the covers 25.

Adjacent to and suitably connected to the casing 20 is a second gear case 27 containing the speed gears and the backing gear. Adjustably mounted in one end of the case 27 is a threaded ring 28 forming one member of a ball bearing 29 which supports a shaft 30. Mounted on the shaft 30 at one end is a gear 31 having internal and external teeth. On the other end of the shaft 30 is mounted the driving pinion 23, previously referred to. The outer end of the shaft 30 is supported in ball bearings 32 seated in a part of the casing 20. The ball bearings 32 consist of inner and outer rings with intermediate balls, the outer rings being fixed in the casing and the inner rings fixed on the shaft 30. The bevel pinion 23 is preferably provided on its back with a ball bearing 33 which coöperates with the ring 28 to take the thrust which the bevel pinion receives in driving the gear 14. The function of the adjustability of the ring 28 is to adjust the bevel-gear 23 with respect to the gear 14. When the ring 28 is adjusted it carries with it the shaft 30 and the gears thereon, and it will be evident that the shaft must move longitudinally in the bearing 32, which is seated in the bracket forming part of the casing.

Power is communicated through a shaft 34 and a universal joint 35, to the gear shaft 36. The inner end of the gear shaft is mounted in ball bearings 37 in the inner end of the casing 27, while the outer end of the shaft 36 has a bearing in the shaft 30. The portion of the shaft 36 within the casing 27 is polygonal and on it slides a pair of gears 38, 39. The gear 39 is adapted to fit the internal teeth of the gear 31 and when these two gears are in engagement, the shaft 36 drives the pinion 23 directly and at the same speed as the motor shaft 34.

Mounted in suitable ball bearings in the case 27 is a counter shaft 40 provided with two speed gears 41, 42, and a transmission gear 43 in mesh with the gear 31. When the gears 38 and 41 are in mesh the vehicle is driven at a slow speed. When the gears 39 and 42 are in mesh the machine is driven at an intermediate speed, and when the gears 39 and 31 are engaged the vehicle is driven at the highest speed. When the gears 38, 39, are in the position shown in Fig. 1, the motor is disconnected from the driving gear 14. While the gears are in this position the backing gear 44 may be thrown into mesh with the slow speed gears 38, 41 and the machine may thus be driven backward at a slow speed.

Means for shifting the gears 38, 39, are illustrated in Figs. 1, 3, 4 and 5. 46 indicates a yoke which engages an annular groove between the gears 38, 39. The yoke 46 is mounted on the inner end of a rod 47 which slides in a tubular extension 48 of the casing 27. Means are provided for locking the rod 47 yieldingly in its several adjustments and also for locking it positively. The yielding lock serves to locate the rod and the connected shift gears in their several positions with accuracy and the positive lock serves to hold them and prevent any possible shifting until it is desired to shift them. The yielding lock or latch comprises a tongue 49 which is pressed by a spring 50 into engagement with either one of a series of transverse grooves 51 in the rod 47. The spring is contained in a cup 52 and its tension may be adjusted by a lock 53.

Coöperating with the grooves 51 on the rod 47 is a bolt 54 sliding in an arm 55 of the tube 48. Connected to the bolt 54 is a flat spring 56 which tends at all times to force the bolt into the grooves or recesses 51. As shown the bolt passes through an opening in the spring and the spring projects beyond the bolt and into the path of a cam 57, (Figs. 3 and 4), which is adapted to withdraw the bolt 54. The cam is operated by a lever 58 (Fig. 3) and a link or rod 59 which is preferably connected to the clutch operating mechanism in such manner that the rod 47 will be unlocked when the clutch is open and locked when the clutch is closed. In this respect the present invention resembles the construction in Patent No. 773.097.

The backing gear 44 is mounted on an arm 60 carried by a shaft 61 extending through the inner end of the casing 27. On the outer end of the shaft 61 is an arm 62 by means of which the shaft is rocked. This arm is connected to toggle levers 63, 64, which are operated by a connection 65 extending to a lever or other manually operated means suitably located on the vehicle. Rigidly connected with the arm 60 is a safety device adapted to prevent the backing gear from being thrown into mesh with either the gear 38 or the gear 41, except when said gears are out of engagement as shown in Fig. 1. This device consists of a shoe 66 arranged close to the gear 44. When the gears 38, 39, are in such position that the shoe 66 may enter the annular groove between them, the backing gear 44 is permitted to engage the gears 38 and 41. When the gears 38, 39, are not exactly in this position, the shoe 66 will engage with the teeth of one or other of said gears if it is attempted to throw in the backing gear. It is thus impossible to use the backing gear excepting when the forward speed gears are disconnected.

It will be evident that various changes in details of construction and arrangement may be made without departing from the spirit of the invention and hence I do not desire to be limited to the precise construction and arrangement of parts illustrated and described.

What I claim and desire to secure by Letters Patent is,

1. In a motor vehicle, the combination with the gear case, of a shaft rotatably mounted in said case, a driven gear on one end of said shaft and a driving pinion on the other end thereof, a bearing for the shaft intermediate said gears, and a bearing for the end of the shaft beyond the driving pinion, said latter bearing comprising an outer ring secured in a bracket of the casing, an inner ring upon the shaft, and intermediate balls.

2. In a motor vehicle, the combination with the gear case, of a bearing ring adjustably mounted in said case, a shaft 30 rotatably mounted in said ring and provided with a gear at one side of said ring, and a beveled driving pinion at the other side thereof, one end of said shaft projecting beyond said beveled pinion, a bearing for said projecting end of the shaft secured in a portion of said casing, a shaft 36 having a bearing in said shaft 30, and an operative connection between the shaft 36 and the gear.

3. In a motor vehicle, the combination with a gear case, of a ring adjustably mounted in said case, a shaft rotatably mounted in said ring and having a driving gear at one end and a driving pinion at the other end thereof, and a bearing for the end of the shaft beyond the driving pinion, said bearing being arranged in a bracket of the casing.

4. In a motor vehicle, a plurality of speed gears in combination with means for sliding a portion of said gears into and out of engagement with other gears, means for locking said slidable gears in different positions, said means comprising a slidable rod, a device for holding said rod yieldingly in different positions, and a yieldingly operated device for locking said rod positively in different positions.

5. In a motor vehicle, a plurality of speed gears in combination with means for sliding a portion of said gears into and out of engagement with other gears and locking said slidable gears in different positions, said means comprising a slidable rod, a spring latch coöperating with recesses in said rod to hold the same yieldingly in different positions, and a yieldingly operated bolt coöperating with recesses in said rod to hold the rod positively in different positions.

6. In a motor vehicle, a plurality of speed gears in combination with means for sliding a portion of said gears into and out of engagement with other gears and locking said slidable gears in different positions, said means comprising a slidable rod, a spring latch coöperating with recesses in said rod to hold the same yieldingly in different positions, a bolt coöperating with recesses in said rod to hold the rod positively in different positions, and means for moving the bolt yieldingly into and positively out of operative position.

7. In a motor vehicle, a plurality of speed gears in combination with means for sliding a portion of said gears into and out of engagement with other gears and locking said slidable gears in different positions, said means comprising a slidable rod, a spring latch coöperating with recesses in said rod to hold the same yieldingly in different positions, a bolt coöperating with recesses in said rod to hold the rod positively in different positions, a spring for throwing the bolt into operative position and a cam for withdrawing the bolt.

8. In a motor vehicle, a plurality of speed gears in combination with means for sliding a portion of said gears into and out of engagement with other gears, a device for locking said slidable gears yieldingly in different positions, and a yieldingly operated device for locking said gears positively in different positions.

9. In a motor vehicle, the combination with a plurality of speed gears, of means for sliding a portion of said gears into and out of engagement with other gears, a device for locking said means yieldingly in different positions, a device for locking said means positively in different positions, a spring for operating said positive device, and means for unlocking said positive device.

10. In a motor vehicle, the combination with a plurality of speed gears, of a rod for sliding a portion of said gears, a casing for said gears, a bushing for said rod forming an extension of said casing and provided with a transverse arm, a device mounted in said arm constructed to hold said rod yieldingly in different positions, and a device for locking said rod positively in different positions.

11. In a motor vehicle, the combination with a plurality of speed gears, of a rod for sliding a portion of said gears, a casing for said gears, a bushing for said rod forming an extension of said casing and provided with oppositely arranged arms, a device mounted in one of said arms constructed to hold said rod yieldingly in different positions, and a device mounted in the other arm constructed to lock the rod in different positions.

In testimony whereof I have signed my name to this specification in the presence of two subscribing witnesses.

CHARLES SCHMIDT.

Witnesses:
F. E. PAINE, Jr.
RUSSELL HUFF.